United States Patent [19]

Eckle et al.

[11] 4,393,735

[45] * Jul. 19, 1983

[54] CUTTING PLATE CARRIER INSERTABLE IN A HOLDER OF A MACHINE TOOL, IN PARTICULAR A LATHE TOOL

[75] Inventors: Otto Eckle, Loechgau; Helmut Veigel, Schwieberdingen, both of Fed. Rep. of Germany

[73] Assignee: Komet Stahlhalter- und Werkzeugfabrik Robert Breuning GmbH, Besigheim, Fed. Rep. of Germany

[*] Notice: The portion of the term of this patent subsequent to Jan. 3, 1995, has been disclaimed.

[21] Appl. No.: 206,775

[22] Filed: Nov. 14, 1980

[30] Foreign Application Priority Data

Jan. 16, 1980 [DE] Fed. Rep. of Germany ... 8000947[U]

[51] Int. Cl.³ .................. B23B 27/00; B23B 29/00
[52] U.S. Cl. .................. 82/36 R; 407/46; 407/48; 407/99; 407/101; 76/101 R
[58] Field of Search ......... 82/36 R; 76/101 R, 101 A; 407/46, 40, 101, 104, 99, 76, 48, 42, 120

[56] References Cited

U.S. PATENT DOCUMENTS

| | | | |
|---|---|---|---|
| 3,015,214 | 1/1962 | Konwal | 407/99 |
| 3,138,847 | 6/1964 | Berry, Jr. | 407/99 |
| 3,359,612 | 12/1967 | Mina | 407/99 |
| 4,066,376 | 1/1978 | Eckle et al. | 407/101 |
| 4,226,560 | 10/1980 | Kraemer | 407/101 |

*Primary Examiner*—Leonidas Vlachos
*Attorney, Agent, or Firm*—Flynn, Thiel, Boutell & Tanis

[57] ABSTRACT

A cutting plate carrier insertable in a holder of a machine tool, in particular a lathe tool. The carrier has a plane base surface and a substantially circular plan, the axis of which coincides with the axis of a central screw thread. The cutting plate carrier is provided with a recess for a polygonal cutting plate having a central bore. The cutting plate can be fixed in the recess by means of a clamping screw which can be screwed into the central screw thread. For the cutting plate, the recess has a plane supporting surface arranged parallel to the base surface and a number of bearing surfaces corresponding to the number of lateral surfaces of the cutting plate and extending parallel thereto. These bearing surfaces are arranged at the same distance (a) from the central screw thread. A second screw thread for screwing in a retaining screw inserted into the holder from below is provided parallel to the central screw thread.

6 Claims, 9 Drawing Figures

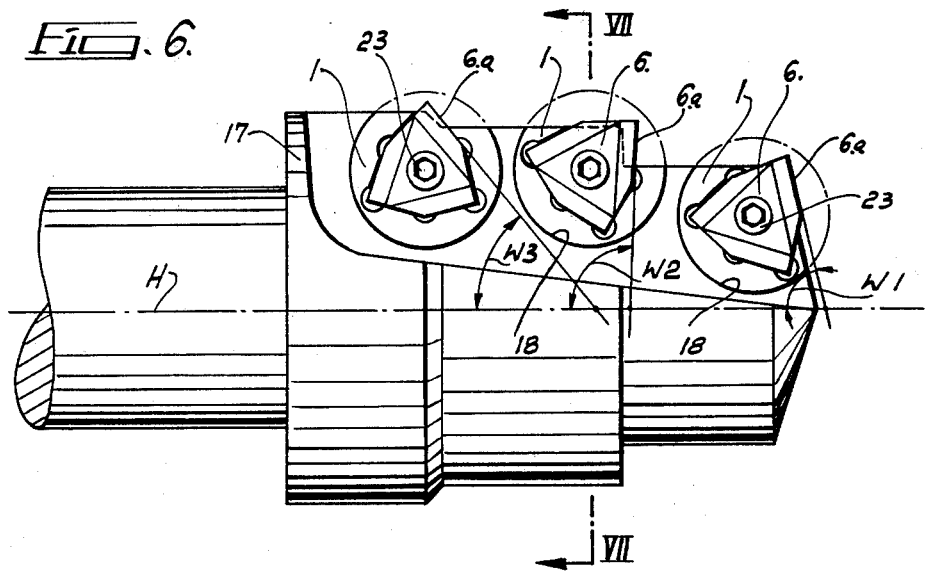
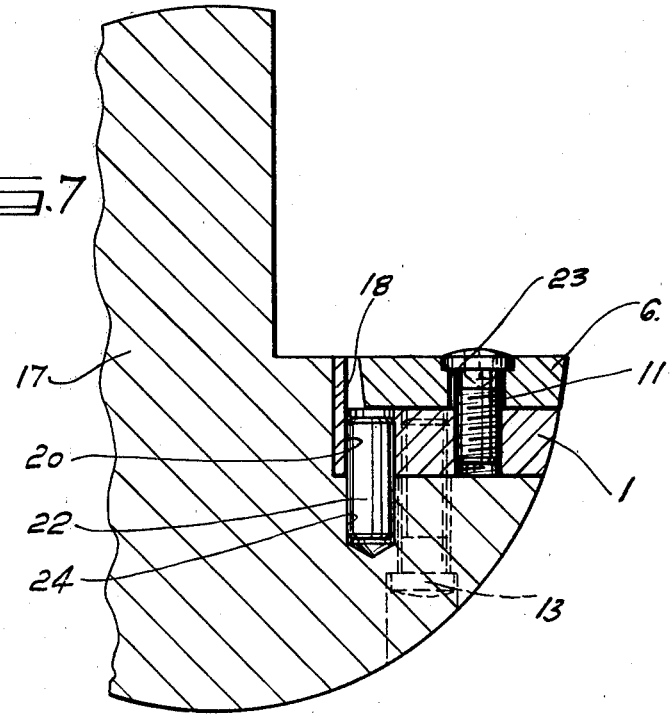

4,393,735

CUTTING PLATE CARRIER INSERTABLE IN A HOLDER OF A MACHINE TOOL, IN PARTICULAR A LATHE TOOL

FIELD OF THE INVENTION

The invention relates to a cutting plate carrier insertable in a holder of a machine tool, in particular a lathe tool, the cutting plate carrier having a plane base surface and an at least semi-cylindrical peripheral surface adjacent and extending perpendicularly thereto and the axis of which coincides with the axis of a central screw thread provided in the cutting plate carrier and extending perpendicularly to the base surface, a recess for a polygonal cutting plate having a central bore and fixable in the recess by means of a clamping screw which can be screwed into the central thread, for which cutting plate the recess has a plane supporting surface arranged parallel to the base surface and a plurality of bearing surfaces extending parallel to the lateral surfaces of the cutting plate, and a second screw thread provided parallel to the central screw thread and for screwing in a retaining screw inserted into the holder from below, the radius of the peripheral surface being only slightly greater than the distance of the cutting tips of the cutting plate from its central bore.

BACKGROUND OF THE INVENTION

In a known cutting plate carrier of this kind (German Pat. No. 25 06 902), the peripheral surface extends over an angle of about 135° to 160°. The remaining part of the cutting plate carrier extends parallel to the remaining side walls of the cutting plate. A cutting plate carrier of this kind is inserted in a recess of a holder of a machine tool. The simple external contour of the cutting plate carrier with an approximately semi-cylindrical peripheral surface and a plane base surface requires a recess of blind hole type in the holder, which can be produced very simply by means of an end-milling cutter. For this reason, users of lathe tools can make them themselves in case of need. They merely obtain the cutting plates with the associated cutting plate carriers, which can be manufactured in large numbers with great accuracy by means of suitable special machines, from another manufacturer. In this way, the users of the lathe tools can make the tool holders, such as turning tool holders, boring bars, boring heads and other special tools, themselves and need only then insert the prepared cutting plate carriers into the recesses which are simple to produce. The known cutting insert carriers in which the peripheral surface extends over an angle of 135° to 160° are always suitable, however, only for a certain mounting angle in the particular holder. This mounting angle is determined by the position which that cutting edge of the cutting plate which is operative at any given time is to adopt with respect to the axis of the holder or with respect to the workpiece. A certain cutting insert is always usable only for a certain mounting angle range. This has the disadvantage that not only must the manufacturer of the cutting plate carriers produce and keep in stock a plurality of differently shaped cutting plate carriers for a certain size of cutting plate, but the user must also order the cutting plate carriers according to the desired mounting angles and keep them in stock himself. Wrong orders and wrong stocks are moreover not out of the question.

Therefore, the problem underlying the invention is to provide a cutting plate carrier of the kind mentioned at the beginning insertable in a holder of a machine tool, in particular a lathe tool, and which, with a certain shape and size of cutting plate, is suitable for all the mounting angles that arise and moreover ensures optimum support of the cutting plate.

According to the invention, this is achieved in that the cutting plate carrier has a substantially circular plan, the axis of which coincides with the axis of the central screw thread, and the recess has a number of bearing surfaces for the lateral surfaces of the cutting plate which correspond to the number thereof, the bearing surfaces being arranged at an equal distance from the central screw thread.

The novel cutting plate carrier is supplied in the abovedescribed form to the user of a lathe tool, who then makes the desired lathe tool, for example a turning tool, a boring bar, a boring head or some other special tool, for himself using the cutting plate carrier. For this purpose, the user must merely provide in the holder a recess in the form of a blind hole, which can easily be produced, as well as a hole for the retaining screw. He can then mount or fit the cutting plate carrier in the desired angular position of rotation, so that the cutting edge of the cutting plate extends at the desired angle to the longitudinal axis of the holder. Advantageously, this angular position of rotation is also secured by means of a locating pin which is inserted in a locating bore provided for this purpose in the cutting plate carrier and in a corresponding bore in the holder. The protruding parts of the cutting plate carrier are then removed by stripping, grinding, milling or filing, which can also be associated at the same time with the finishing of the holder. Finally, it is only further necessary to insert the cutting plate into the carrier and fix it by means of the clamping screw. One and the same cutting plate carrier can be employed for the most diverse desired mounting angles of the operative cutting edge. This has the advantage that the manufacturer of the cutting plate carrier only has to make and keep in stock one type of carrier for a certain shape and size of cutting plate. The user can also now order larger numbers at the same time and keep them in stock himself, since he can use these for the most diverse mounting angles. Wrong orders and erroneous planning are avoided. At the same time, however, it is always ensured that the cutting plate carrier embraces the cutting plate on the greatest possible number of lateral surfaces and, consequently, ensures optimum support for the cutting plate. Furthermore, the cutting plate carrier, like the already known cutting plate carrier, has the advantage that it has no shoulders or recesses projecting beyond the cutting plate, so that swarf cannot settle, and that in the event of damage, which may occur when a cutting edge breaks, it can moreover be easily exchanged for a fresh one.

Advantageous developments of the invention are characterised in the sub-claims.

BRIEF DESCRIPTION OF THE DRAWINGS

The invention is described in detail hereinafter with reference to a plurality of embodiments shown in the drawings.

In the drawings:

FIG. 6 shows a special tool for simultaneously producing a plurality of countersinks;

FIG. 7 is a partial cross-section on the line VII—VII in FIG. 6;

DETAILED DESCRIPTION

Figure 1:
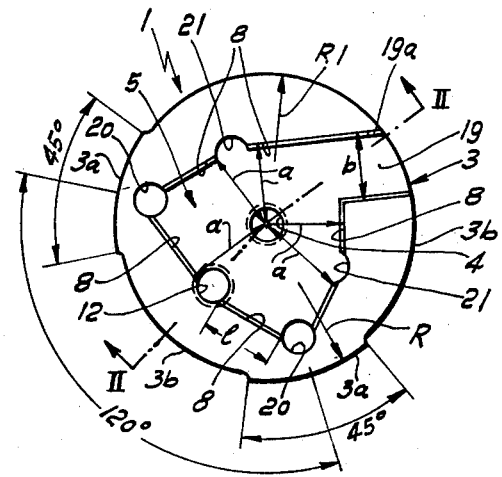
FIG. 1 is a plan view of a first embodiment of the cutting plate carrier.
Figure 2:
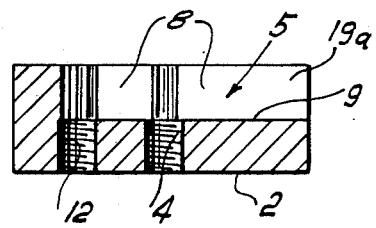
FIG. 2 is a cross-section on the line II—II in FIG. 1.

In the drawing, the reference 1 designates the entire cutting plate carrier. This has a plane base surface 2 and a peripheral surface 3 adjacent and extending perpendicularly thereto. The cutting plate carrier has a substantially circular plan. The axis of this circular plan coincides with the axis of a central screw thread 4. Moreover, the cutting plate carrier is provided with a recess 5 for a hexagonal cutting plate 6. This hexagonal cutting plate 6 has six lateral surfaces 7. The recess 5 has a number of bearing surfaces 8 for the lateral surfaces 7 of the cutting plate 6 which corresponds to the number thereof, namely six, and also a supporting surface 9 extending parallel to the base surface. These bearing surfaces are all at the same distance a from the axis A of the central screw thread. The radius of the peripheral surface 3 is moreover so chosen that it is only slightly greater than the distance of the cutting tips 10 of the cutting plate 6 from its central bore 11.

The cutting plate carrier 1 moreover has a second screw thread 12 extending parallel to the central screw thread 4. This second screw thread, as can be seen from FIG. 7, serves for screwing in a retaining screw 13 inserted into the holder 17 from below.

In order to accommodate the cutting plate carrier 1 in one of the holders 14 to 17 shown in FIGS. 3 to 7, each of these holders has a recess 18 in the form of a blind hole and which can easily be produced with an end-milling cutter. In order to create satisfactory abutment conditions between the peripheral surface 3 of the cutting plate carrier and the inner cylindrical boundary surface of the recess 18, the peripheral surface 3 has the full radius R in two peripheral zones 3a off-set with respect to one another by about 120° and each extending over about 45°, and a somewhat smaller radius in the zones 3b located therebetween. The effect achieved by this is that the cutting plate carrier 1 bears against the inner boundary surface of the recess 18 only by means of the zones 3a of its peripheral surface 3. Stable support is thereby ensured at two points. Certain tolerances in the diameters of the cutting plate carrier and the recess are therefore of no importance.

So that the cutting plate 6 may fit satisfactorily into the recess 5, this recess must be milled out by means of a small end-milling cutter. In this process, the production of the recess is simplified in that the cutting plate carrier 1 has in the region of the recess 5 a passage 19 opening on the one hand into the recess 5 and on the other hand into the peripheral surface 3, the width b of which passage is smaller than the length l of a bearing surface 8 and one side wall 19a of which is in line or aligned with a bearing surface 8 of the recess 5. In the production of the recess, the end-milling cutter enters the material of the cutting plate carrier from the peripheral surface 3 and first produces the passage 19 and then the recess 5. The operative cutting tip is moreover subsequently located in the region of the passage 19. Due to the arrangement of the passage 19, the result is also obtained that the supporting surface 9 of the recess 5 is not interrupted in the region of the operative cutting tip by one of the bored-out corners to be described hereinafter.

The passage 19 is advantageously arranged at a side of the carrier 1 which is diametrically opposite the second screw thread 12.

Furthermore, the carrier 1 has at least one locating bore 20 arranged at a distance from the central screw thread 4. In the embodiments shown in FIGS. 1 and 8, two such locating bores 20 are provided in each case. The locating bores 20 and the second screw thread 12 are advantageously provided in the region of the corners or angles formed by the bearing surfaces 8. In this way, the locating bores 20 and the core bore for the second screw thread 12 serve at the same time as bored-out corners. Such bored-out corners 21 are necessary in each case at that point where two bearing surfaces 8 would meet, since a sharp-edged corner cannot be produced with an end-milling cutter, but the cutting plate 6 has sharp cutting tips 10.

Figure 3:
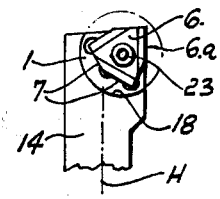
FIGS. 3 to 5 show various turning tools with different mounting angles of the cutting plate carrier.

The described cutting plate carrier 1 is inserted in the prepared recess 18, for example of the turning tool 14 shown in FIG. 3. It is then rotated until the cutting edge 6a of the cutting plate 6 which is located in the region of the passage 19 has the desired mounting angle with respect to the longitudinal axis H of the holder. In FIG. 3, this mounting angle is 0°, since the cutting edge 6a extends parallel to the longitudinal axis of the holder. In a similar manner to that shown in FIG. 7, the cutting plate carrier can be clamped in the desired position by means of a retaining screw 13. This position can thereafter also be fixed by making one or two bores 24 in the holder for locating or fixing pins 22 which engage in the locating bores 20 of the cutting plate carrier 1. The locating bores 20 can moreover serve as a drilling template.

After the cutting plate carrier has been secured to the holder 14 and fixed in position in this way, those parts of the carrier 1 which protrude beyond the holder, which are shown in chain-dotted lines in FIG. 3, can be removed by machining, for example by milling, grinding, filing or the like, and the final shape of the cutting plate carrier is then obtained. The cutting plate 6 is then inserted in the carrier and fixed by means of the clamping screw 23, which extends through the central bore 11 of the cutting plate and is screwed into the central screw thread 4 of the cutting plate carrier 1.

Figure 4:
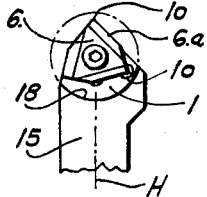
Figure 5:
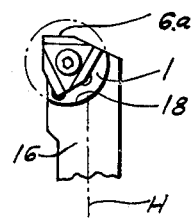

It can be gathered from FIGS. 4 and 5 that, with the same basic form of the cutting plate carrier, turning tools can also be produced with the holders 15 and 16, in which turning tools the operative cutting edge 6a is arranged at a different mounting angle with respect to the longitudinal axis H of the holder.

In FIGS. 6 and 7 there can be seen a special tool which serves for simultaneously producing three different countersinks. The operative cutting edge 6a of the foremost cutting plate, shown on the extreme right in FIG. 6, encloses a mounting angle W1 of 75° with the axis H of the holder 17. The operative cutting edge 6a of the intermediate cutting plate is arranged at an angle W2 of 90° and the operative cutting edge 6a of the cutting plate on the left at an angle W3 of 45° with respect to the axis H of the holder. For accommodating the cutting plates arranged at the most diverse angles, the same cutting plate carriers 1 of circular plan have been used in each case, these having been brought into their final shape by stripping after being fixed and located on the holder 17. As can be seen, the bearing surfaces 8 of the recess 5 embrace in each case a plurality of lateral surfaces of the cutting plates and consequently establish optimum support between the cutting plate and the cutting plate carrier. Moreover, the cutting plate 6 fits into its particular carrier 1 and the latter fits into the holder 17 without any projections or shoulders or recesses, so that no swarf can become caught.

Figure 8:
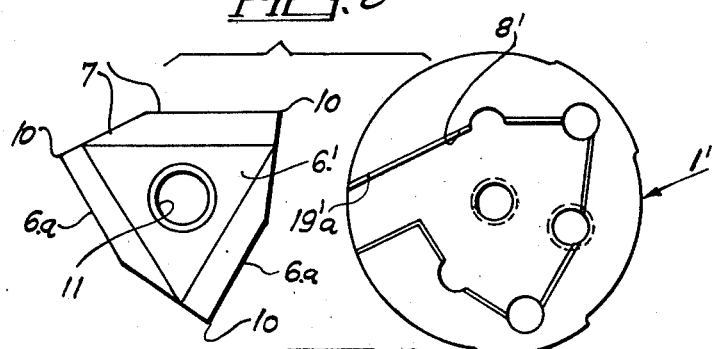
FIGS. 8 and 9 are plan views of another two embodiments with the cutting plates belonging respectively thereto.

Whereas the cutting plate carrier shown in FIGS. 1 to 7 can be employed for accommodating a left-hand cutting plate 6 at all the mounting angles that arise, the cutting plate carrier 1' shown in FIG. 8 is required for accommodating a right-hand cutting plate 6'. This carrier has substantially the same features as the cutting plate carrier shown in FIGS. 1 and 2, with the sole difference that the passage 19' extends in a different direction and one lateral surface 19a thereof is in line or aligned with a different bearing surface 8'.

If necessary, one and the same cutting plate carrier could also be employed for right-hand and left-hand cutting plates if the passage is so arranged that its longitudinal central axis extends radially through one of the cutting tips of the cutting plate.

Figure 9:
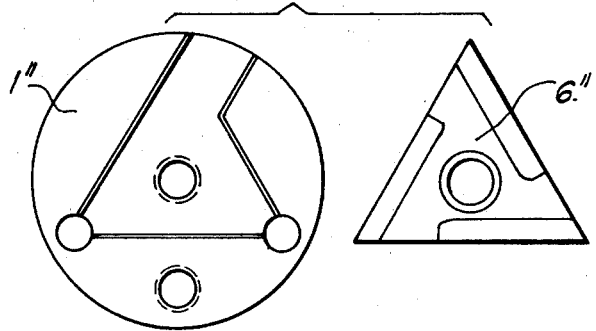

It is intended to show by means of FIG. 9 that the underlying principle of the invention can also be used for any other desired shape of cutting plate, for example an equilateral triangle. The cutting plate carrier 1" illustrated in FIG. 9 is intended to accommodate a left-hand triangular cutting plate 6".

The embodiments of the invention in which an exclusive property or privilege is claimed are defined as follows:

1. In a cutting plate carrier insertable in a holder of a machine tool, in particular a lathe tool, said cutting plate carrier having a plane base surface and a cylindrical peripheral surface adjacent and extending perpendicularly thereto and the axis of which coincides with the axis of a central screw thread provided in said cutting plate carrier and extending perpendicularly to the base surface, a recess for a polygonal cutting plate having plural cutting tips, plural lateral surfaces and a central bore therein and fixable in said recess by means of a clamping screw which can be screwed into said central thread, for which cutting plate said recess has a plane supporting surface arranged parallel to said base surface and a plurality of bearing surfaces extending parallel to said lateral surfaces of said cutting plate, and a second screw thread provided parallel to said central screw thread and for screwing in a retaining screw inserted into said holder from a side thereof remote from said recess, the improvement comprising wherein said cutting plate carrier has a substantially circular plan, the axis of which coincides with the axis of said central screw thread, wherein the number of said plurality of bearing surfaces corresponds to the number of said plural lateral surfaces on said cutting plate, said bearing surfaces each being arranged at an equal distance (a) from said central screw thread, and wherein the radius of said peripheral surface of said cutting plate carrier is only slightly greater than the distance of said cutting tips of said cutting plate from its said central bore, whereby said cutting tips are wholly radially inside said peripheral surface and in said recess to thereby render said cutting plate unusable until undesired portions of said cutting plate carrier are removed to expose a desired amount of said cutting plate.

2. The cutting plate carrier according to claim 1, wherein said peripheral surface has a full radius (R) in two peripheral zones (3a) off-set with respect to one another by about 120° and each extending over about 45°, and a somewhat smaller radius (R1) in the zones (3b) located therebetween.

3. The cutting plate carrier according to claim 1, wherein in the region of said recess a passage is provided opening on the one hand into said recess and on the other hand into said peripheral surface, the width (b) of which passage is smaller than the length (l) of a bearing surface, and one side wall of said passage is in alignment with a bearing surface of said recess.

4. The cutting plate carrier according to claim 3, wherein said passage is arranged at a side of said cutting plate carrier which is diametrically opposite said second screw thread.

5. The cutting plate carrier according to claim 1, wherein at least one locating bore extending perpendicularly to said base surface is provided.

6. The cutting plate carrier according to claim 5, wherein said locating bore and said second screw thread are provided in the region of the corners formed by said bearing surfaces.

* * * * *